United States Patent
Meyers (10) Patent No.: US 12,013,293 B2
(45) Date of Patent: Jun. 18, 2024

(54) SYSTEMS AND METHODS FOR TEMPERATURE MEASUREMENTS

(71) Applicant: SEMICONDUCTOR COMPONENTS INDUSTRIES, LLC, Phoenix, AZ (US)

(72) Inventor: Manuel Hortensia L Meyers, Leuven (BE)

(73) Assignee: SEMICONDUCTOR COMPONENTS INDUSTRIES, LLC, Scottsdale, AZ (US)

(*) Notice: Subject to any disclaimer, the term of this patent is extended or adjusted under 35 U.S.C. 154(b) by 272 days.

(21) Appl. No.: 17/656,288

(22) Filed: Mar. 24, 2022

(65) Prior Publication Data

US 2023/0304870 A1    Sep. 28, 2023

(51) Int. Cl.
*G01K 7/16* (2006.01)
*G01K 7/22* (2006.01)
*G01K 7/24* (2006.01)

(52) U.S. Cl.
CPC ............. *G01K 7/223* (2013.01); *G01K 7/24* (2013.01)

(58) Field of Classification Search
None
See application file for complete search history.

(56) References Cited

U.S. PATENT DOCUMENTS

| | | | |
|---|---|---|---|
| 9,389,128 B2* | 7/2016 | Tashiro | G01K 7/22 |
| 10,837,843 B2* | 11/2020 | Kawahara | G01K 7/24 |
| 2016/0003686 A1* | 1/2016 | Matsumoto | G01F 25/10 |
| | | | 374/1 |
| 2019/0242759 A1* | 8/2019 | Hikosaka | G01K 7/25 |

FOREIGN PATENT DOCUMENTS

| | | |
|---|---|---|
| EP | 2924405 A1 | 9/2015 |
| JP | 2005003596 A | 1/2005 |
| WO | 2014080723 A1 | 5/2014 |

* cited by examiner

*Primary Examiner* — Jeffrey S Zweizig
(74) *Attorney, Agent, or Firm* — Brake Hughes Bellermann LLP (57) ABSTRACT

A method includes using a thermistor as a temperature sensor and connecting a pull-up resistor in series to the thermistor in a voltage divider circuit. The pull-up resistor is fabricated in an integrated circuit and includes a series of resistor segments connected to selectable voltage output tabs. The method further includes selecting an output voltage tab for a selected resistance segment having a selected resistance value to match a target resistance value for the pull-up resistor that is smaller than the as-fabricated resistance value of the pull-up resistor, calculating a ratio of a voltage on the thermistor and a voltage on the selected output voltage tab in the voltage divider circuit, and mapping the calculated ratio to a temperature value of the thermistor based on a temperature-resistance relationship of the thermistor in combination with the target resistance value of the pull-up resistor.

22 Claims, 8 Drawing Sheets

SYSTEMS AND METHODS FOR TEMPERATURE MEASUREMENTS

FIELD OF THE DISCLOSURE

The present disclosure relates to microelectronic circuits and more specifically to circuits for measuring temperature.

BACKGROUND

The performance of electrical or mechanical apparatuses (e.g., electronic devices, pressure sensors, micro-electromechanical systems (MEMS) devices, flow rate measuring devices, battery cells, temperature monitors, heating, ventilation and air conditioning (HVAC) systems, oil pressure and temperature measurements, medical devices, process controllers, etc.) in various situations can be a function of the external temperature. Often, the external temperature needs to be measured to correct or otherwise control operation of an apparatus.

SUMMARY

In a general aspect, an integrated circuit includes an analog stage coupled to a digital stage. The analog stage includes a connection to an external temperature-dependent resistor, and a pull-up resistor connected to the external temperature-dependent resistor in a voltage divider circuit. The pull-up resistor has an as-fabricated resistance value and includes a plurality of resistor segments. The analog stage further includes a multiplexer configured to select at least one of the plurality of resistor segments having a resistance value to match a target resistance value for the pull-up resistor. Further, the digital stage is coupled to the analog stage by an analog-to-digital convertor (ADC). The ADC is configured to digitize a voltage on the external temperature-dependent resistor and a voltage for the selected resistor segment having the resistance value for processing in the digital stage.

In a general aspect, an integrated circuit includes a pair of external terminals for connection to an external temperature-dependent resistor, and a pull-up resistor connected in series to the external temperature-dependent resistor in a voltage divider circuit. The pull-up resistor having has an as-fabricated resistance value. The pull-up resistor includes resistor segments connected to selectable voltage output tabs. Each resistor segment has a smaller resistance value than the as-fabricated resistance value of the pull-up resistor. The integrated circuit further includes a sliding switch attached to the pull-up resistor. The sliding switch is configured to short at least one resistor segment in the pull-up resistor.

The integrated circuit further includes a multiplexer and an analog-to-digital convertor (ADC). The multiplexer is connected to the selectable voltage output tabs, and configured to select an output voltage tab for a selected resistance segment having a selected resistance value to match a target resistance value for the pull-up resistor. The ADC is configured to digitize a voltage on the external temperature-dependent resistor and a voltage on the selected output voltage tab for the selected resistance segment having the selected resistance value.

In a general aspect, a method includes disposing a thermistor as a temperature sensor in an environment, and connecting a pull-up resistor in series to the thermistor in a voltage divider circuit fabricated in an integrated circuit. The pull-up resistor and includes a series of resistor segments connected to selectable voltage output tabs, each resistor segment having a smaller resistance value than an as-fabricated resistance value of the pull-up resistor. The method further includes selecting an output voltage tab for a selected resistance segment having a selected resistance value to match a target resistance value for the pull-up resistor that is smaller than the as-fabricated resistance value of the pull-up resistor, and calculating a ratio of a voltage on the thermistor and a voltage on the selected output voltage tab in the voltage divider circuit, the ratio being proportional to a resistance of the thermistor. The method further includes mapping the calculated ratio to a temperature value of the thermistor based on a temperature-resistance relationship of the thermistor in combination with the target resistance value of the pull-up resistor.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate like parts throughout the several views and drawings.

DETAILED DESCRIPTION

In some applications, a temperature-dependent resistor, i.e., a thermistor, is used as an externally-placed thermometer for determining the external temperature. The resistance of the thermistor at the external temperature can be determined, for example, in a voltage divider circuit, by balancing the unknown resistance of the thermistor against a known impedance (e.g., a pull-up resistor) in series or in parallel with the thermistor. In some implementations, the thermistor's resistance value determined by the voltage divider circuit is mapped to a temperature value. In some implementations, the thermistor's resistance value determined by the voltage divider circuit is mapped to a temperature value using, for example, a temperature-resistance relationship (e.g., a manufacturer supplied look-up table (LUT) representing a temperature-resistance relationship curve of the thermistor).

In an integrated circuit (IC) version of a temperature measuring circuit, the known impedance (e.g., the pull-up resistor) in the voltage divider circuit is a resistor that is built in a semiconductor die or IC chip. However, the built-in resistors do not have resistance values that are fixed or invariant but have values that can vary with chip temperature and/or from die-to-die (e.g., due to processing variations). Because of these variations in the resistance of the pull-up resistor, different temperature-measuring ICs can assign different resistance values to the same thermistor and yield different temperature read-outs for an actual external temperature. For accurate read-outs of the actual external temperature, it can be desirable to account for the variations from the specified values (e.g., resistance) of the resistors of the temperature-measuring IC.

The present disclosure describes a temperature-measuring integrated circuit (IC) and method for measuring an external temperature accurately using a thermistor as the external temperature sensor. The thermistor can be a negative temperature coefficient thermistor (a.k.a. NTC) or positive temperature coefficient thermistor (a.k.a. PTC). The integrated circuit can be implemented in a semiconductor die or IC chip with external terminals for connection to the thermistor. The IC and method involve measuring a resistance of the thermistor in the external temperature environment in a voltage divider circuit with reference to an on-chip reference resistor (Rpull-up).

The value of the resistance of on-chip resistors (e.g., Rpull-up) can vary from die-to-die due to processing variations (and also due to variations in the temperature of the IC chip). Because of these variations in the resistance of the pull-up resistor, different temperature-measuring ICs can assign different resistance values to the same thermistor and yield different temperature read-outs for the actual external temperature. In other words, the die-to-die processing variations in the resistance of the pull-up resistor and variations in the temperature of the IC chip may result in inaccurate determinations of the external temperature.

In the disclosed temperature-measuring IC and method, the difficulties in determinations of the external temperature associated with the die-to-die processing variations and IC chip temperature variations can be overcome by using an on-chip reference resistor (Rpull-up) having a range of selectable pre-defined resistance values.

In example implementations, the on-chip reference resistor Rpull-up is implemented on the IC chip in a digital potentiometer-like arrangement with its resistance value being selected (e.g., selected digitally) for use in the voltage divider circuit. The selected resistance value of Rpull-up can be a target value selected for use in the voltage divider circuit largely independent of any die-to-die processing variations and any IC-chip temperature dependent variations in the IC component values. The thermistor's resistance value determined using the selected Rpull-up resistance value is then digitally mapped to the external temperature based on a known temperature-resistance relationship curve of the thermistor.

Figure 1A:
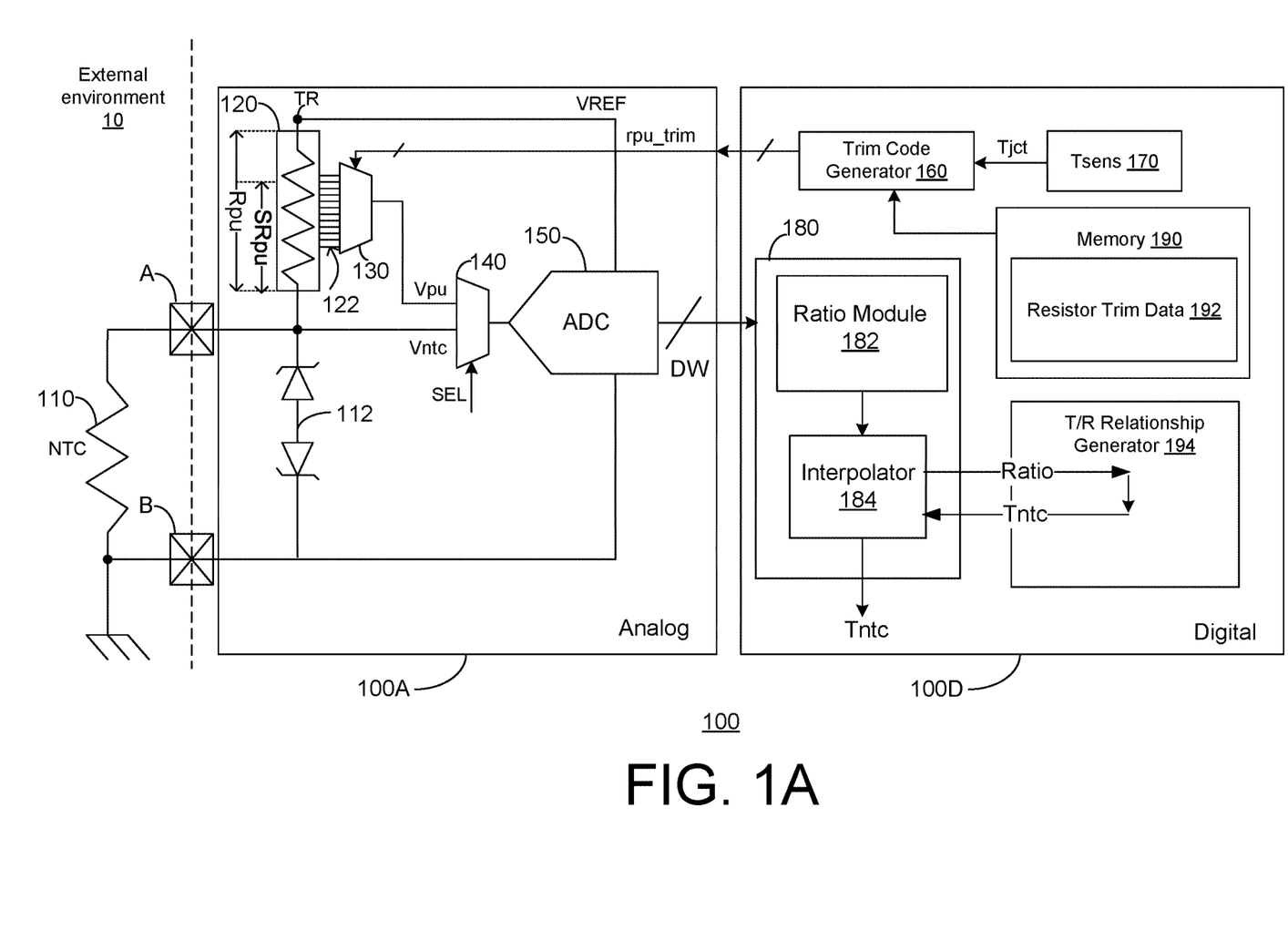
FIG. 1A is a block diagram of an example implementation of a temperature-measuring integrated circuit.

FIG. 1A is a block diagram of an example implementation of a temperature-measuring integrated circuit (e.g., IC 100) for measuring an external temperature (e.g., in an external environment 10) using a thermistor (e.g., NTC 110) as the external temperature sensor, in accordance with the principles of the present disclosure.

In example implementations, IC 100 includes analog voltage divider circuits (e.g., in an analog IC stage 100A), and digital control and data processing circuits (e.g., in a digital IC stage 100D).

Analog IC stage 100A may have two external terminals or pins (e.g., pin A and pin B) across which NTC 110 can be connected in the external environment 10. One end of NTC 110 (e.g., pin B) may be grounded. Analog IC stage 100A further includes an internal (i.e., on-chip) reference resistor (e.g., pull-up resistor 120) that is connected in series to NTC 110 (e.g., at terminal A). Pull-up resistor 120 may have an as-fabricated resistance value Rpu. For voltage divider measurements, a voltage (e.g., VREF) can be applied across the series combination of NTC 110 and pull-up resistor 120 (e.g., VREF can be applied between a reference voltage terminal TR on the top of pull-up resistor 120 and pin B (ground)). A pair of back-to-back Zener diodes (e.g., diodes 112) may be placed between pins A and B to prevent over voltages from damaging the circuits.

In example implementations, the internal reference resistor (e.g., pull-up resistor 120) can be a tabbed resistor having a plurality of selectable resistance values (e.g., SRpu). The selectable resistance values (e.g., SRpu) may be smaller than the resistance (e.g., Rpu) of the full as-fabricated pull-up resistor 120.

In example implementations, pull-up resistor 120 may be fabricated as a series of resistive elements or segments of smaller resistance value connected to (selectable) voltage output tabs (e.g., output tabs 122). Each output tab 122 may correspond to a different smaller resistance value than the resistance (e.g., Rpu) of the full as-fabricated pull-up resistor 120. The output tabs 122 may be connected to a multiplexer 130. Multiplexer 130 can receive (e.g., from a trim code generator 160 in digital IC stage 100D) a digital instruction or trim code (e.g., rpu_trim) to trim (i.e., lower) the resistance value of pull-up resistor 120 to a lower value. In example implementations, the trim code (e.g., rpu_trim) may identify a selected output tab 122 corresponding to a seemingly lower resistance value (e.g., SRpu) for pull-up resistor 120 than the resistance (e.g., Rpu) of the full as-fabricated pull-up resistor 120. Multiplexer 130 may respond to the digital instruction or trim code (e.g., rpu_trim) by selecting a pull-up voltage output (Vpu) of the selected output tab 122 corresponding to the selected lower resistance value SRpu of pull-up resistor 120.

The voltage (e.g., Vntc) on NTC 110 at pin A and the pull-up voltage output Vpu can be used to calculate a resistance of NTC 110 at the external temperature ($T_{ntc}$).

In example implementations, analog IC stage 100A may include a multiplexer 140, which sends analog Vntc and Vpu signals to an analog-to-digital convertor (e.g., ADC 150) for conversion to digital word values (DW). ADC 150 couples circuits in analog IC stage 100A with circuits in digital IC stage 100D. The digital word values (DW) of Vntc and Vpu are then sent from ADC 150 to digital IC stage 100D for processing (e.g., for calculating the temperature of NTC 110 (Tntc)). ADC 150 may digitize the ratio of an input voltage (e.g., Vntc or Vpu) to a reference voltage. ADC 150 may, for example, be supplied with the same reference voltage as the reference voltage (e.g., VREF) applied to reference voltage terminal TR on the top of pull-up resistor 120. However, the ratio of the two measured input voltages (e.g., Vntc/Vpu) is independent of the reference voltage supplied to, or used by, ADC 150.

Further, digital IC stage 100D may, for example, include a temperature sensor (e.g., Tsens 170), a memory 190 (e.g., non-volatile memory (NVM)), a Rpu selection module (e.g., trim code generator 160), and a data processing module 180.

In digital IC stage 100D, the die temperature (on-chip temperature of IC 100) may be determined by the on-chip temperature sensor (i.e., Tsens 170). In example implementations, Tsens 170 may, for example, be a semiconductor bandgap-based temperature sensor. The temperature sensor may, for example, utilize the principle that the forward voltage of a diode (e.g., a silicon diode), which may be the base-emitter junction of a bipolar junction transistor (BJT), is temperature-dependent. In example implementations, Tsens 170 may be configured to determine a junction temperature Tjct (i.e., the die temperature) based on measurements of the forward junction voltage of a diode.

In digital IC stage 100D, the Rpu selection module (e.g., trim code generator 160) may generate instructions (e.g., a digital trim code) for trimming or lowering the resistance value of pull-up resistor 120 (RN) (e.g., to a target resistance value) for a voltage divider circuit measurement of the resistance of NTC 110 in analog IC stage 100A. Trim code generator 160 may choose the digital trim code for trimming the value of resistor 120 (Rpu) to the target value on the basis of the junction temperature Tjct of the chip (as obtained from Tsens 170) and on the basis of trimming data (e.g., resistor trim data 192) stored in memory (e.g., memory 190).

The selected target value of resistance of resistor 120 may correspond to a fraction of the pull-up resistor that matches a target impedance value of the pull-up resistor over a temperature range. The selected target value (or fraction) of resistance of resistor 120 may not be constant over the temperature range, and may have either a positive or negative temperature coefficient of resistance (TCR).

Memory 190 may include resistor trim data 192 for selecting a target resistance value of pull-up resistor 120 (for the voltage divider measurements in analog IC stage 100A, discussed above). Characteristics (e.g., resistance value and temperature behavior) of each individual pull-up resistor 120 may be obtained, for example, by automated test equipment (ATE) tests conducted, for example, on processed semiconductor wafers in which the individual pull-up resistor 120/IC 100 die have been fabricated in a production environment. Based on the ATE test results, resistor trim data 192 may include a listing for selecting a target resistance value for the individual pull-up resistor 120 at a few (e.g., 1-10) different IC (die) temperatures (or temperature ranges) of operation. The listing in resistor trim data 192 in memory 190 may, for example, include digital trim codes identifying selected target resistance values for the individual pull-up resistor 120 at different temperatures. The digital trim codes for two different die temperatures (temp1 and temp2) may, for example, be listed as temp1, trimcode1; and temp2, trimcode2; in resistor trim data 192. Each of the digital trim codes (e.g., trimcode1 or trimcode2) may include the target resistance value for the pull-up resistor at the listed temperature (e.g., temp 1 or temp2) of the integrated circuit (die), and instructions for multiplexer 130 to select a pull-up voltage output (Vpu) of pull-up resistor 120 corresponding to the target resistance value.

Trim code generator 160 may choose the digital trim code for trimming the value of pull-up resistor 120 (Rpu) to the target value by interpolating the temperature Tjct of the chip between the different die temperatures (e.g., temp1 and temp2) that are listed in resistor trim data 192 on memory 190.

Figure 1B:
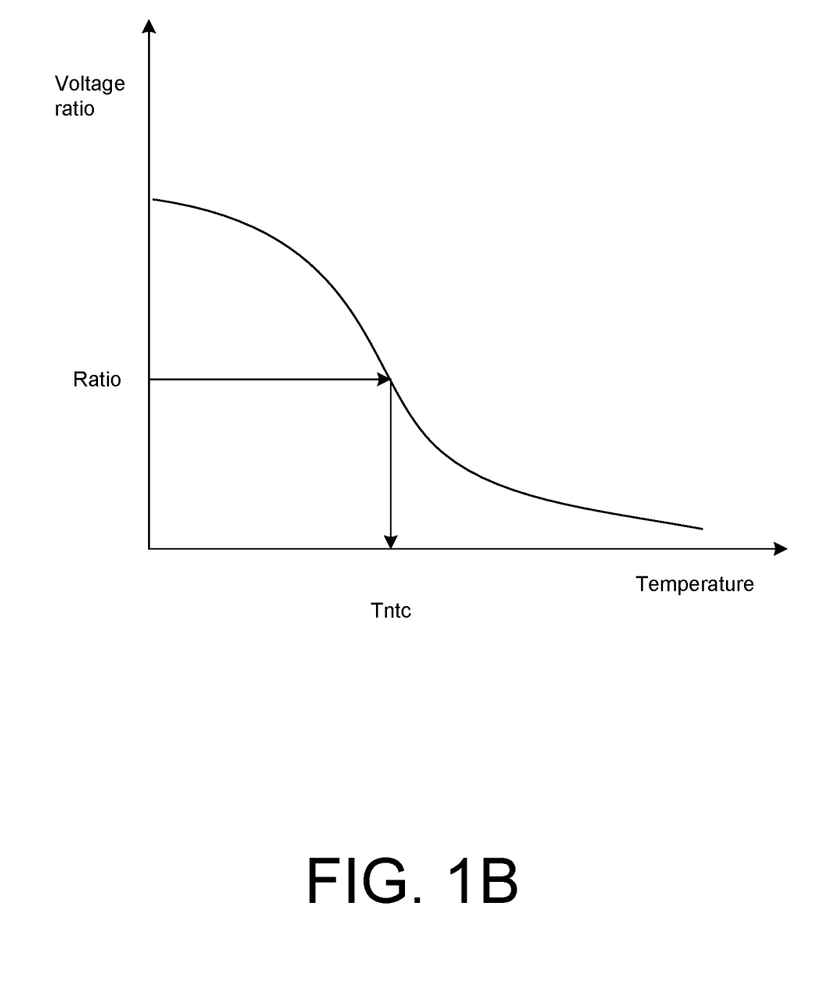
FIG. 1B is a graph representing a relationship between a temperature of a thermistor and a voltage ratio proportional to a resistance of the thermistor.

The digital IC stage 100D may further include a temperature-resistance (T/R) relationship generator 194 that can calculate the temperature-resistance relationship curve for the thermistor (NTC 110). In some implementations, temperature-resistance (T/R) relationship generator 194 may use, or may be use, a look-up table (LUT) (e.g., an LUT stored in the memory 190) for calculating the temperature-resistance relationship for the thermistor. The LUT can represent the temperature-resistance relationship curve for the thermistor (NTC 110) combined with the target resistance values of the pull up resistor. For purposes of illustration, FIG. 1B shows in graphical form the relationship between a temperature of a thermistor (on the x axis) and a voltage ratio proportional to a resistance of the thermistor (on the y axis). In some implementations, the LUT may be stored in memory 190 and made accessible to ratio module 182.

In example implementations, T/R relationship generator 194 may be programmable (e.g., a programmable LUT). T/R relationship generator 194 may be configured for an ideal system including a typical thermistor and an on-chip reference resistor $R_{pull\_up}$ (e.g., pull-up resistor 120) having a target resistance value (Rtarget).

In some implementations, Rtarget may be the same as (or about the same as) the selected resistance value (SRpu) of pull-up resistor 120 used for the measurements of Vntc and Vpu in analog IC stage 100A (described above).

Further in digital IC stage 100D, data processing module 180 may include algorithms for determining the external temperature of NTC 110 (Tntc) based on the resistance of NTC 110 (Rntc) or equivalently based on a ratio of the digital word values (DW) of Vntc and Vpu received from ADC 150 of analog IC stage 100A.

In example implementations, data processing module 180 may, for example, implement algorithms in the ratio module 182 to calculate a ratio of Vntc and Vpu received from ADC 150 in the analog IC stage 100A. Ratio module 182 may, for example, calculate the ratio based the following voltage divider equations:

$$\text{ratio} = Vntc/Vpu = V(\text{NTC})/(V(\text{NTC}) + V(SRpu)),$$

where V(NTC) is the voltage on NTC 110 (at pin A) and V(SRpu) is the voltage drop (of VREF) across the selected resistance value (SRpu) of pull-up resistor 120.

Data processing module 180 may, for example, further implement algorithms in an interpolator 184 to determine a thermistor temperature (Tntc) value corresponding to the ratio Vntc/Vpu (calculated by ratio module 182). In example implementations, interpolator 184 may, for example, be coupled to the T/R relationship generator 194 (e.g., a look-up table (LUT)) representing the temperature-resistance relationship of thermistor 110. The T/R relationship generator 194 (e.g., a LUT stored in a memory), may, for example, include a list or table of thermistor temperature values (Tntc) for a discrete set of the ratios (Vntc/Vpu). Interpolator 184 may estimate a value for the thermistor temperature (Tntc) for an intermediate ratio Vntc/Vpu (calculated by ratio module 182), for example, by linear or polynomial interpolation of the thermistor temperature (Tntc) values between neighboring values of (Vntc/Vpu) in the T/R relationship generator 194.

In some example implementations, interpolator 184 may calculate a thermistor temperature (Tntc) value corresponding to the ratio Vntc/Vpu (calculated by ratio module 182) using a mathematical function, F (ratio Vntc/Vpu)=(Tntc) (not shown). The mathematical function F may be a polynomial function corresponding to, for example, the temperature-resistance relationship curve for thermistor 110 shown in FIG. 1B.

The interpolated (or calculated) thermistor temperature (Tntc) for the ratio Vntc/Vpu can accurately represent the external temperature of the external environment 10. There can be no need for any further corrections to account for die-die variations or temperature variations of components (e.g., pull-up resistor 120) of IC 100.

In the foregoing implementations, the pull-up resistor (e.g., pull-up resistor 120) is trimmed by selecting an output tab 122 that corresponds to the predetermined target resistance value (Rtarget) for measurement by ADC 150. This avoids the need to compensate for any curvature over temperature of the calculated ratio due to Rpu variations.

In the implementations discussed above, the selected resistance value SRpu of pull-up resistor 120 may correspond to selection of an output tab with a pull-up voltage output Vpu to be further processed by ADC 150 over an expected temperature range. An input range of ADC 150 that allows high accuracy or high resolution processing may be limited. The selected resistance value SRpu may be selected so that output tab voltage output Vpu (and the thermistor voltage Vntc) are within the input range of ADC 150 that allows high accuracy or high-resolution processing.

In the implementations discussed above, ADC 150, which digitizes the voltages Vpu and Vntc, may have a limited input range for high accuracy or high-resolution digitization results. Below 5% and above 95% of a specified ADC input range, the ADC accuracy can degrade, for example, due to small input signals (e.g., Vntc) being overwhelmed by external noise levels that are independent of the input NTC voltage Vntc. Also, a temperature slope of small NTC voltages may be small, as the voltage changes over temperature are smaller. As a result, a small error in ADC 150 can result in a larger temperature read-out error.

A way to decrease the resolution demands on ADC 150 is to increase or maximize the input voltages (e.g., Vpu or Vntc) applied to ADC 150 by multiplexer 140. In some example implementations, input voltages (e.g., Vpu or Vntc) can be increased by shorting the pull-up resistor segments located above the selected output tab 122 that corresponds to the selected resistance value SRpu of pull-up resistor 120. In the voltage divider circuit, by the shorting the voltages that would otherwise drop over the non-selected resistances (i.e., the pull-up resistor segments in resistor 120 located above the selected output tab 122) are reallocated or redistributed as additional voltage drops over NTC 110 (Vntc) and the non-shorted portions of pull-up resistor 120 (SRpu, Vpu).

Figure 2A:
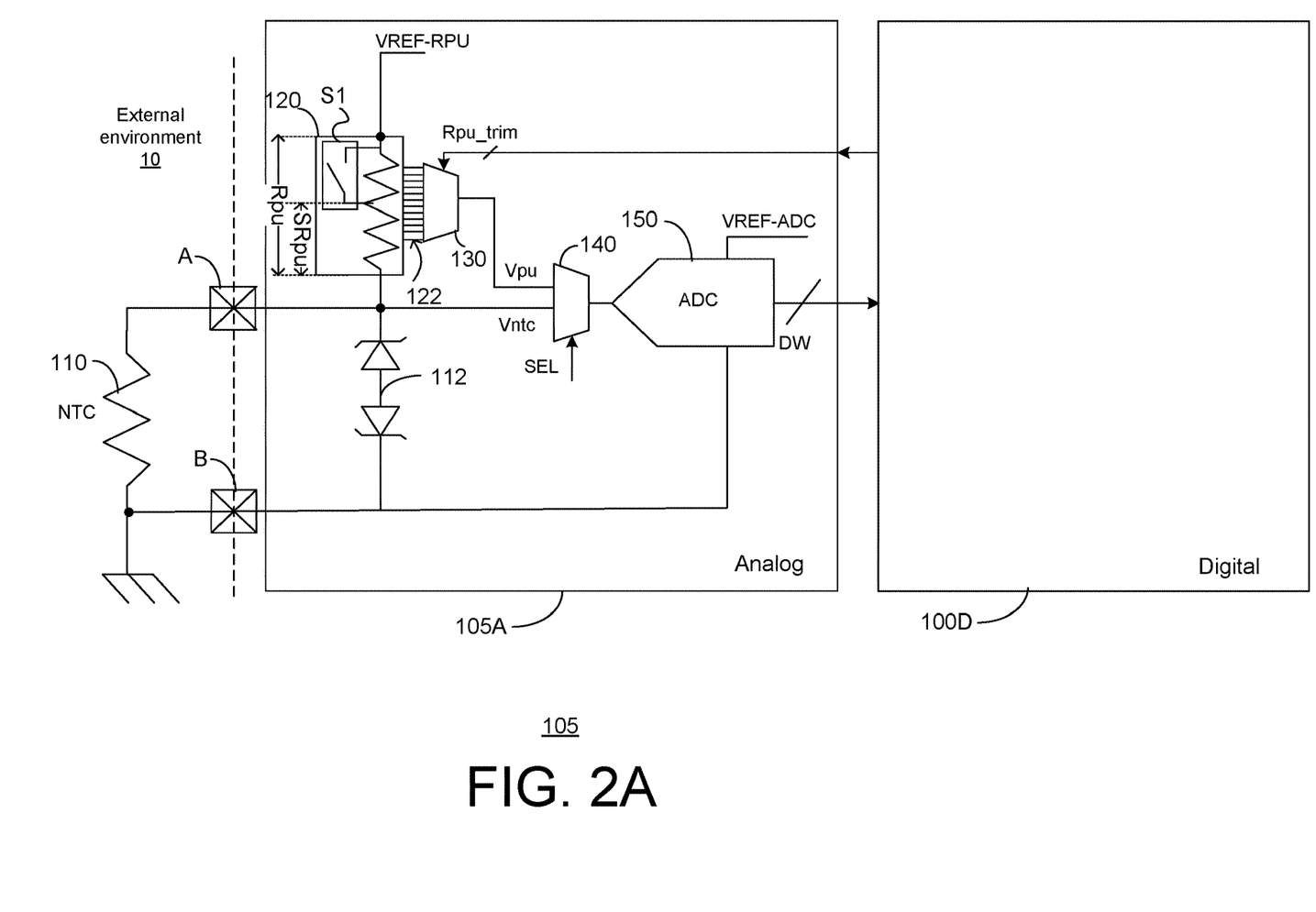
FIG. 2A is a block diagram of another example implementation of a temperature-measuring integrated circuit.

FIG. 2A shows an example temperature measuring integrated circuit 105 configured to short the unselected resistance segments of the pull-up resistor (i.e., resistor 120).

Integrated circuit 105 may include an analog IC stage (e.g., analog IC stage 105A) coupled to a digital IC stage (e.g., digital IC stage 100D, FIG. 1A). Analog IC stage 105A (like analog IC stage 100A, FIG. 1A) may include an internal reference resistor (e.g., pull-up resistor 120) that is connected in series to NTC 110 (e.g., at terminal A) for voltage divider measurements. A reference voltage (e.g., VREF-RPU) can be applied across the series combination of NTC 110 and pull-up resistor 120. A different reference voltage (e.g., VREF-ADC) is applied to ADC 150, which digitizes Vntc and Vpu.

In example implementations, the internal reference resistor (e.g., pull-up resistor 120) in IC 105 (as in IC 100) can be a tabbed resistor having a plurality of selectable resistance segments that may be selected (e.g., with a resistance value, SRpu) for voltage output by an output tab 122 responsive to a digital instruction (e.g., a digital trim code) received by multiplexer 130 (from digital IC stage 100D, FIG. 1A).

As shown in FIG. 2A, pull-up resistor 120 in IC 105 may further include (or be attached to) a sliding switch (e.g., switch S1) that may be placed in parallel to the series of resistive segments of resistor 120 that are selectable by output tabs 122. Switch S1 may be activated, for example, by multiplexer 130, to short or bypass the resistance segments that are not selected for output by an output tab 122 (i.e., the unselected resistance segments below reference voltage terminal TR on top of pull-up resistor 120 and above the selected resistance segments having a resistance value SRpu).

Figure 2B:
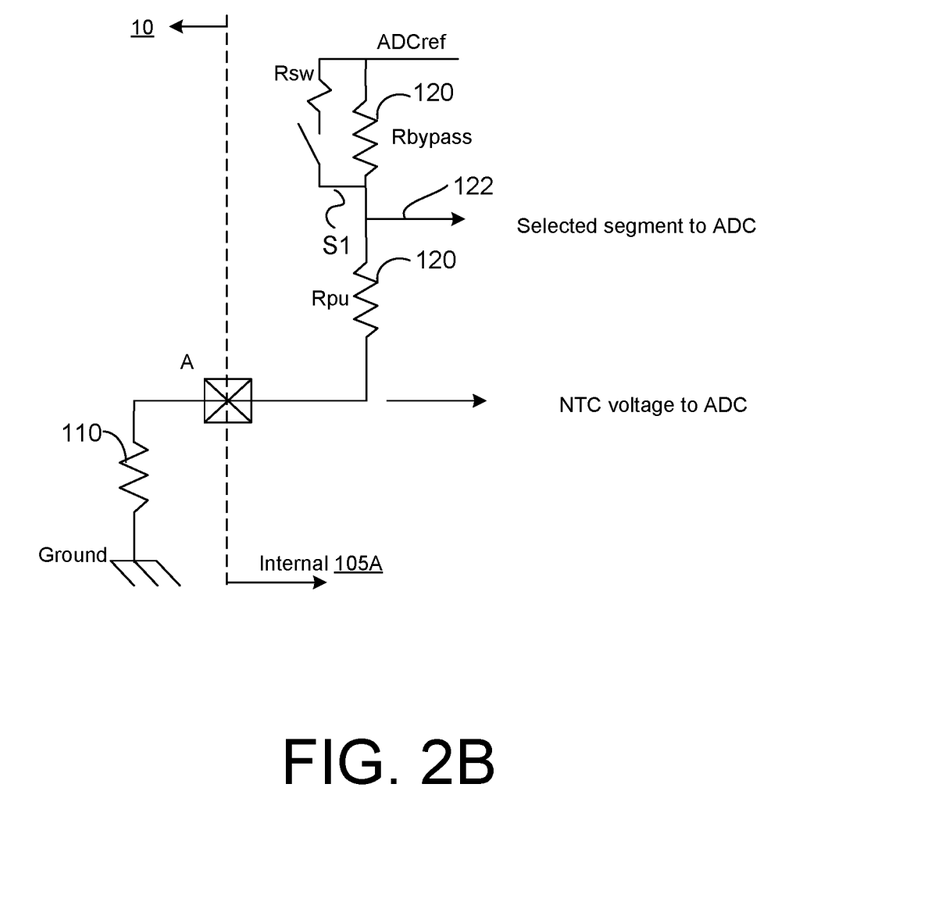
FIG. 2B is a diagram representing the resistors involved in the voltage divider arrangement of the integrated circuit of FIG. 2A.

As shown in FIG. 2B, the shorted resistance segments may have an un-shorted resistance value equal to Rbypass, and switch S1 may itself have an internal resistance Rsw.

FIG. 2B is a diagram representing the resistors involved in the voltage divider circuit arrangement of IC 105 (FIG. 2A). As seen in FIG. 2B, resistor RNTC (of NTC 110), resistor Rpu (of the selected portion of pull-up resistor 120), and resistor Rbypass (of the unselected portions of pull-up resistor 120) are arranged in series between a reference voltage (ADC ref) and ground. Switch S1 with internal switch resistance Rsw is in parallel to resistor Rbypass.

To evaluate the effects of shorting Rbypass, consider an example case in which the reference voltage and the resistors shown in FIG. 2B have the following example values: reference voltage (ADC ref)=1000 mV, RNTC=100 ohms, Rpu=1100 ohms, Rbypass=1030 ohms, and Rsw=20 ohms.

For this example case, when Rbypass is not bypassed by leaving switch S1 in an open position, Vntc=ADC ref*RNTC/(Rpu+Rbypass+RNTC) is equal to about 45 mV. When Rbypass is shorted or bypassed by closing switch S1, Vntc=ADC ref*RNTC/(Rpu+(1/Rbypass+1/Rsw)$^{-1}$+RNTC) is equal to about 82 mV. Thus, shorting the unselected resistance segments of resistor 120 in IC 105 almost doubles the value of Vntc that is input to ADC 150 (FIG. 1A and FIG. 2A) from about 45 mV to about 82 mV. In this manner (i.e., by shorting unselected segments of the pull-up resistor) it may be possible to maximize or increase the Vntc and Vpu voltages that are processed by ADC 150. The Vntc and Vpu voltages may be increased to keep the input voltages to ADC 150 in the 5% to 95% band of a specified voltage input range of ADC (ADC input range) for acceptable resolution or accuracy of the digitized results.

Figure 3:
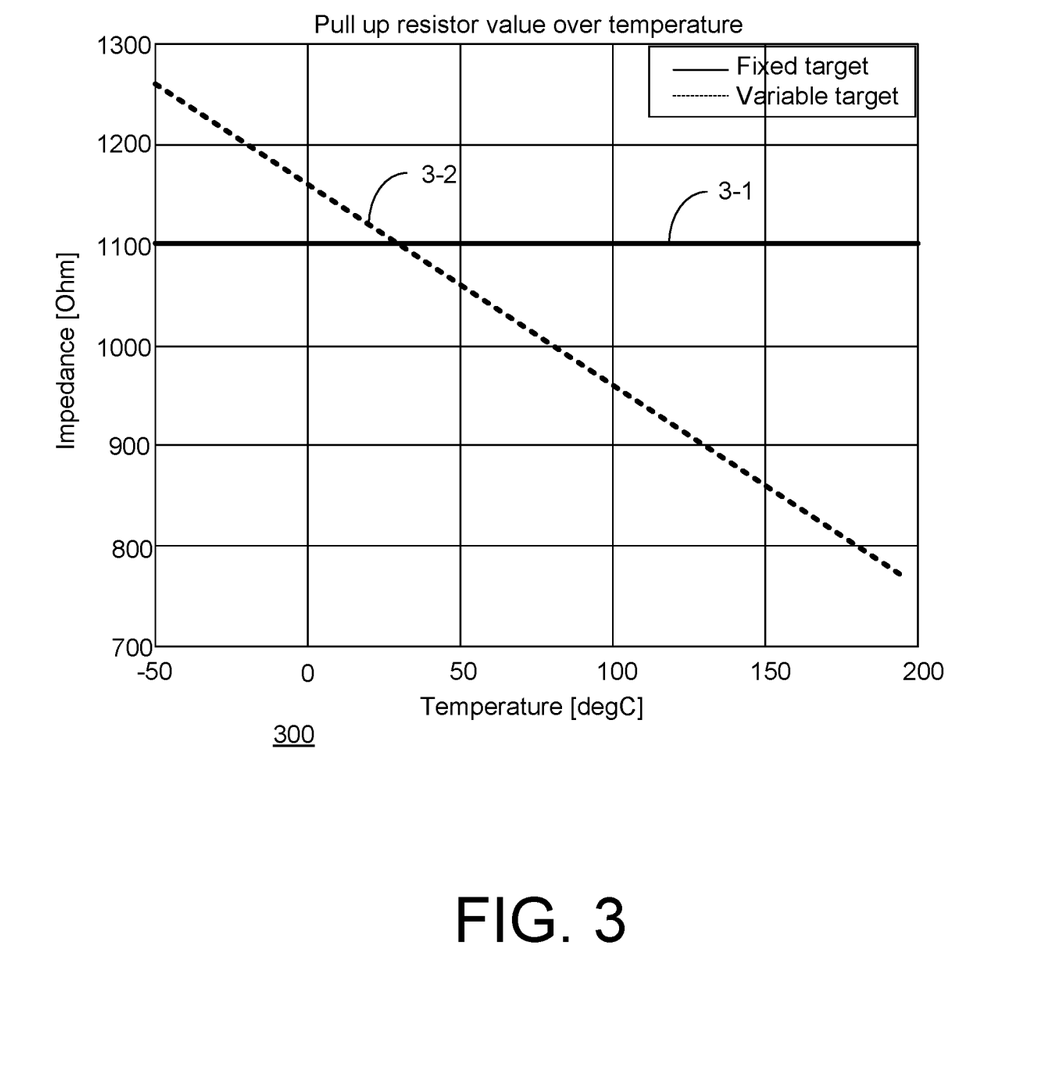
FIG. 3 is a graph of an example temperature dependence of target resistance values for a pull-up resistor.

In the foregoing implementations, a temperature range of resistor values for matching the specified voltage input range of the ADC is larger when the pull-up resistor (e.g., resistor 120) features a negative temperature coefficient of resistance. FIG. 3 shows, for example, a graph 300 of a temperature dependence of target resistance values for matching a pull-up resistor having a specified resistance of 1100 ohms (e.g., specified at room temperature, 25° C.). Two scenarios are shown: (a) fixed target resistance value scenario (3-1) in which the target resistance value is independent of, and does not change with, the temperature dependent variations in the resistance of the pull-up resistor, and (2) a variable target value scenario (3-2) in which the target resistance value can be chosen to match the temperature dependent variations in the resistance of the pull-up resistor.

As shown in FIG. 3, the pull-up resistor may have a negative TCR (i.e., decreasing resistance with increasing temperature) with its resistance varying down from about 1260 ohms at a low temperature of about −50° C. to about 760 ohms at a higher temperature of about 200° C. The target resistance selected in the foregoing implementations (FIG. 1A and FIG. 2A) for scenario 3-2 may have values selected to match the temperature dependent variations of the pull-resistor value over an extended temperature range (e.g., −50° C. to 200° C., 0° C. to 100° C., etc.).

As the pull-up resistor has lower resistance values at higher temperatures, the thermistor voltage Vntc (at pin A) at higher temperatures (but with lower target resistance values in scenario 3-2) can have higher values than the Vntc for a constant target resistance (Rpu) value in scenario 3-1). This can result in a wider temperature range in which the NTC voltage Vntc is within the range from 5% to 95% of the specified voltage input range of ADC (hereinafter ADC input range) for acceptable resolution or accuracy in the digitization results.

Figure 4A:
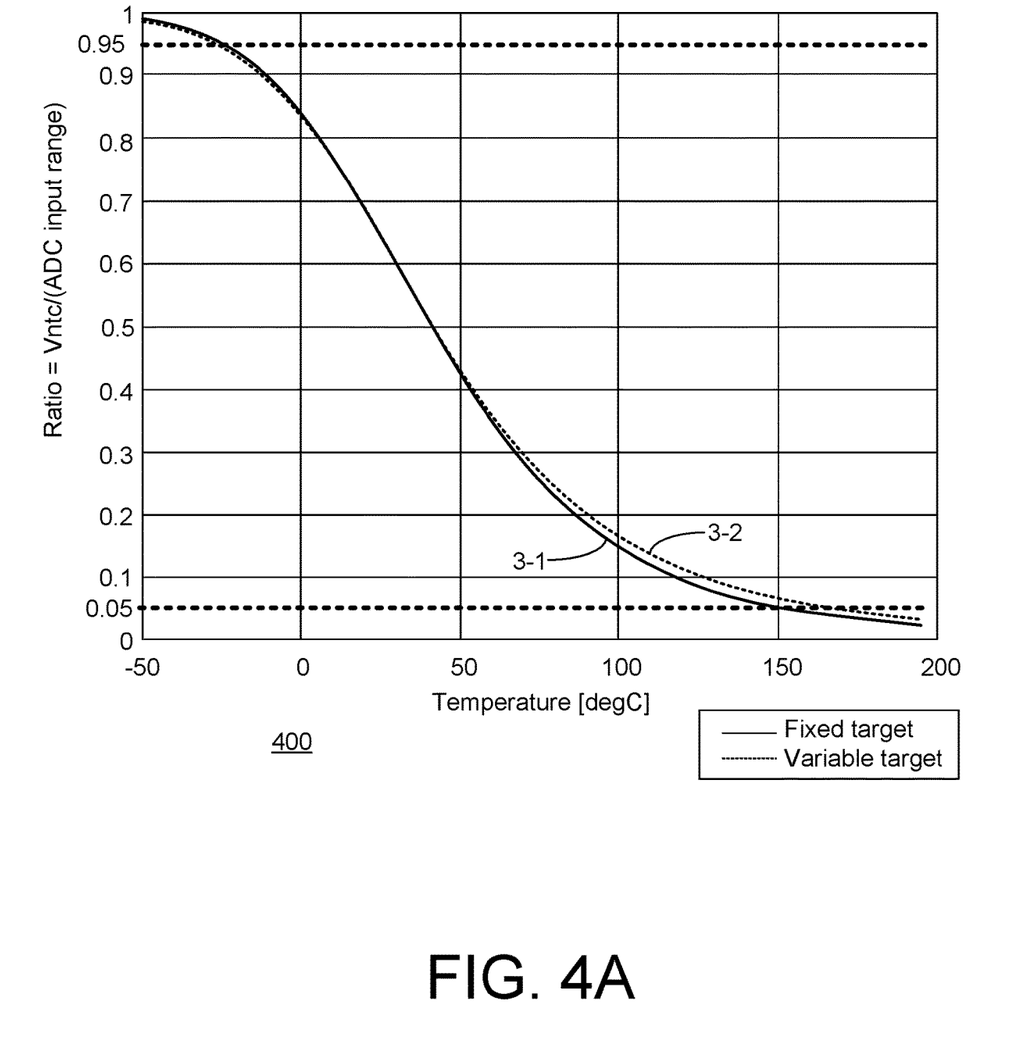
FIG. 4A is a graph of example thermistor voltages (Vntc) as a function of temperature in fixed target resistance scenario, temperature-dependent variable target resistance scenario.
Figure 4B:
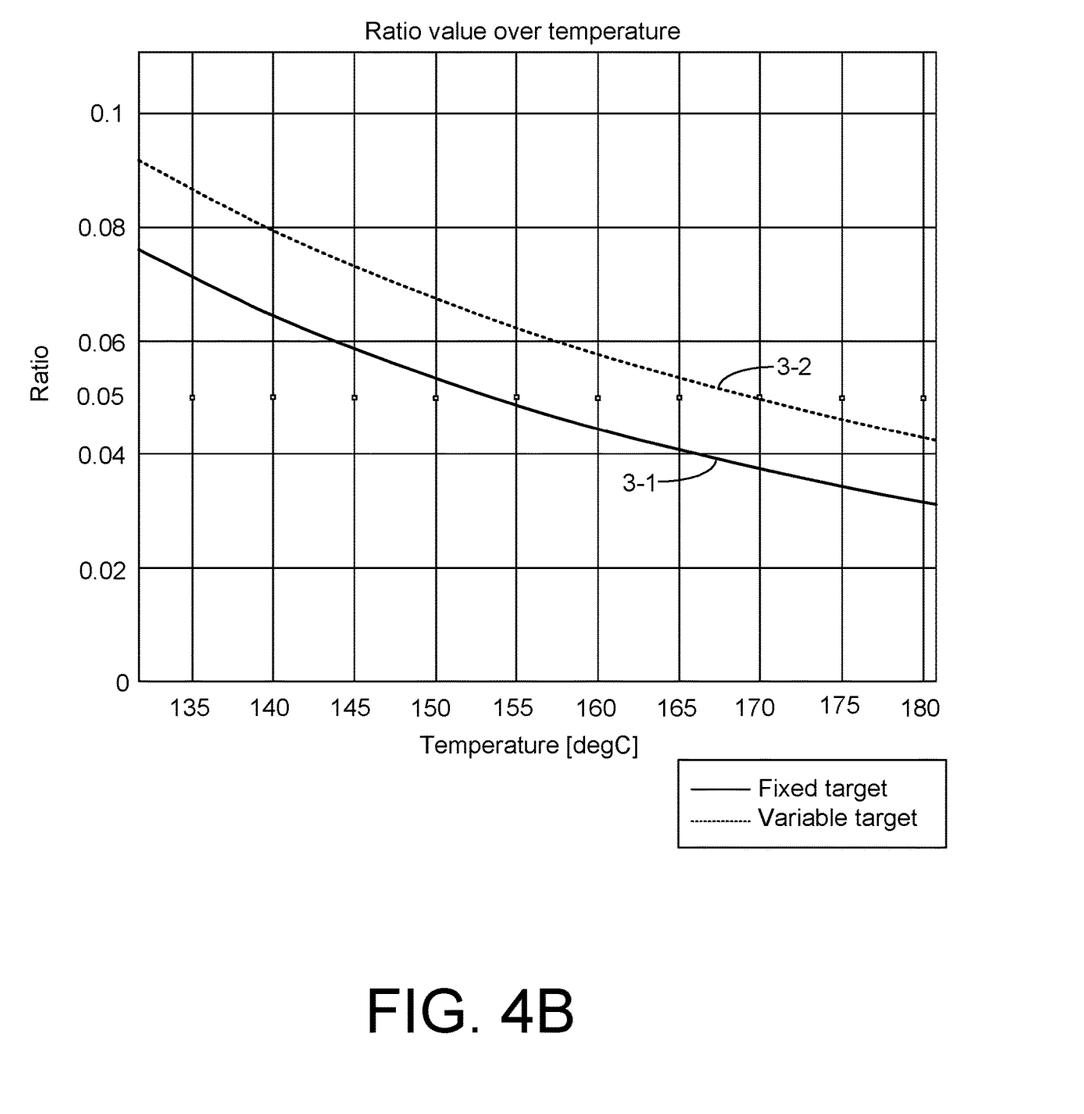
FIG. 4B is an exploded view of a portion of FIG. 4A.

FIG. 4A shows an example a graph 400 illustrating Vntc as a function of temperature in the two scenarios (i.e., scenario 3-1 (fixed target resistance), and scenario 3-2 (temperature-dependent variable target resistance)). FIG. 4B is an exploded view of a portion of FIG. 4A.

In both FIGS. 4A and 4B, the graphs 400 show Vntc values for scenario 3-1 (fixed target resistance) and scenario 3-2 (temperature-dependent variable target resistance) as a function of temperature. The Vntc values shown are normalized relative to the ADC input range. A ratio=(Vntc/ADC input range) having, for example, normalized values between 0 and 1 is plotted on the y-axis for the temperatures shown on the x-axis in both FIGS. 4A and 4B (e.g., in FIG. 4A for temperatures between about −50° C. and about 180° C., and in FIG. 4B for temperatures between about 135° C. and 180° C.). The 5% to 95% band of the specified voltage input range of ADC (ADC input range) for acceptable resolution or accuracy is indicated by the normalized values 0.05 and 0.95 on the y-axis.

As shown in FIGS. 4A and 4B, Vntc values for scenario 3-1 (fixed target resistance) fall outside the 5% to 95% band of the ADC input range for acceptable resolution or accuracy. In particular, in the temperature range of about 155° C. to about 180° C., Vntc values for scenario 3-1 have normalized values less than 0.05 (in other words are less than 5% of the ADC input range). The Vntc values can be increased by selecting temperature-dependent variable target resistances (e.g., in IC 100 and IC 105, as discussed above, e.g., with reference to FIG. 3). FIGS. 4A and 4B show that for scenario 3-2 (temperature-dependent variable target resistance), the Vntc values in the temperature range of about 155° C. to about 180° C. have increased over the values in scenario 3-1. In particular, in scenario 3-2 (temperature-dependent variable target resistance), the Vntc values in the temperature range of about 55 C to 170 C have increased sufficiently to have normalized values for Vntc that are greater than about 0.05 (in other words, are more than 5% of the ADC input range for acceptable resolution or accuracy).

Figure 5:
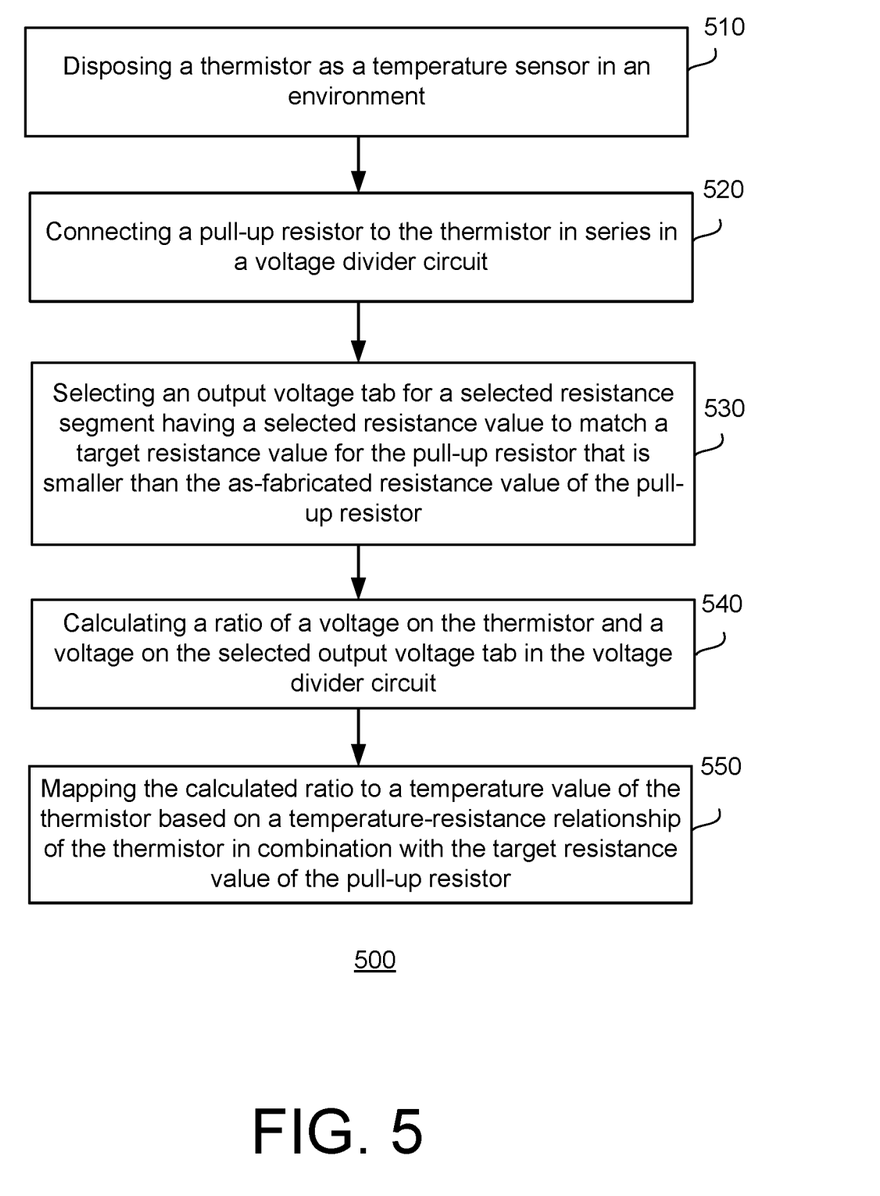
FIG. 5 is a flowchart of a method for measuring a temperature of an external environment.

FIG. 5 illustrates an example method 500 for measuring a temperature of an external environment (e.g., external to an integrated circuit (IC)).

In example implementations, method 500 includes disposing a thermistor as a temperature sensor in an environment (510), and connecting a pull-up resistor to the thermistor in series in a voltage divider circuit (520). The pull-up resistor may be fabricated in an integrated circuit or semiconductor die and include a series of resistor segments connected to selectable voltage output tabs. Each resistor segment may have a smaller resistance value than the resistance of the entire as-fabricated pull-up resistor.

Method 500 further includes selecting an output voltage tab for a selected resistance segment having a selected resistance value to match a target resistance value for the pull-up resistor that is smaller than the as-fabricated resistance value of the pull-up resistor (530), and calculating a ratio of a voltage on the thermistor and a voltage on the selected output voltage tab in the voltage divider circuit (540). The ratio is proportional to a resistance of the thermistor.

Method 500 further includes mapping the calculated ratio to a temperature value of the thermistor based on a temperature-resistance relationship of the thermistor in combination with the target resistance value of the pull-up resistor (550).

In some example implementations, method 500 may include shorting resistor segments between a top of the pull-up resistor and the selected resistance segment (after selecting the output voltage tab for the selected resistance segment having the selected resistance value to match the target resistance value 530).

In example implementations, in method 500, mapping the calculated ratio to a temperature value of the thermistor 550 may include interpolating the temperature value in a T/R relationship generator (e.g., a look-up table (LUT)) representing the temperature-resistance relationship of the thermistor in combination with the target resistance value of the pull-up resistor.

In example implementations, in method 500, the selected resistance value to match the target resistance value for the pull-up resistor may be selected based on a temperature of the integrated circuit measured by an on-chip temperature sensor.

In example implementations, in method 500, selecting an output voltage tab 530 may include generating a digital trim code directing a multiplexer connected to the selectable voltage output tabs to select the output voltage tab of the selected resistance segment having the selected resistance value to match the target resistance value for the pull-up resistor. Generating the digital trim code directing the multiplexer connected to the selectable voltage output tabs may include interpolating the digital trim code from a stored list of trim codes for at least two different temperatures. A trim code for a target resistance value of the pull-up resistor at yet another different temperature (other than the at least two different temperatures in the stored list) of the integrated circuit can be obtained by interpolation of the list of trim codes for the at least two different temperatures of the integrated circuit stored in the memory.

In the specification and/or figures, typical embodiments have been disclosed. The present disclosure is not limited to such exemplary embodiments. For example, the low-dropout voltage regulator is one type of linear voltage regulator, but the disclosed principles may be used with other types of linear voltage regulator circuits as well. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. An integrated circuit, comprising:
   an analog stage including:
   a connection to an external temperature-dependent resistor,
   a pull-up resistor connected to the external temperature-dependent resistor in a voltage divider circuit, the pull-up resistor having an as-fabricated resistance value, the pull-up resistor including a plurality of resistor segments, and
   a multiplexer configured to select at least one of the plurality of resistor segments having a resistance value to match a target resistance value for the pull-up resistor; and
   a digital stage coupled to the analog stage by an analog-to-digital convertor (ADC), the ADC configured to digitize a voltage on the external temperature-dependent resistor and a voltage for the selected resistor segment having the resistance value for processing in the digital stage.

2. The integrated circuit of claim 1, wherein the external temperature-dependent resistor is a thermistor.

3. The integrated circuit of claim 1, wherein the digital stage includes a data processing module configured to calculate a ratio of the voltages digitized by the ADC, the ratio being proportional to a resistance of the external temperature-dependent resistor.

4. The integrated circuit of claim 3, wherein the data processing module is further configured to map the calculated ratio to a temperature of the external temperature-dependent resistor based on a temperature-resistance relationship of the external temperature-dependent resistor in combination with the target resistance value of the pull-up resistor.

5. The integrated circuit of claim 4, further comprising, a look-up table (LUT) stored in a memory, the LUT representing the temperature-resistance relationship of the external temperature-dependent resistor, and wherein the data processing module is configured to interpolate a value of the temperature of the external temperature-dependent resistor from the LUT stored in the memory.

6. The integrated circuit of claim 1, further comprising, a trim code generator configured to generate a digital trim code directing the multiplexer to select the at least one of the plurality of resistor segments having the resistance value to match the target resistance value for the pull-up resistor.

7. The integrated circuit of claim 6, wherein each of the plurality of resistor segments in the pull-up resistor is connected to a voltage output tab, and the trim code generator is configured to generate a digital trim code directing the multiplexer to select the voltage output tab of the at least one of the plurality of resistor segments having the resistance value to match the target resistance value for the pull-up resistor.

8. The integrated circuit of claim 6, wherein the resistance value to match the target resistance value for the pull-up resistor is selected based on a temperature of the integrated circuit measured by an on-chip temperature sensor.

9. The integrated circuit of claim 6, wherein the resistance value is selected to match different target resistance values for the pull-up resistor at different temperatures over a temperature range.

10. The integrated circuit of claim 6, further comprising, a memory with a stored list of trim codes for at least two different temperatures of the integrated circuit, each trim code including a target resistance value of the pull-up resistor at a respective temperature of the integrated circuit.

11. The integrated circuit of claim 10, wherein the trim code generator is configured to generate a trim code for a target resistance value of the pull-up resistor at another different temperature of the integrated circuit by interpolation of the stored list of trim codes for the at least two different temperatures of the integrated circuit stored in the memory.

12. An integrated circuit, comprising;
    a pair of external terminals for connection to an external temperature-dependent resistor;
    a pull-up resistor connected in series to the external temperature-dependent resistor in a voltage divider circuit, the pull-up resistor having an as-fabricated resistance value, the pull-up resistor including resistor segments connected to selectable voltage output tabs, each resistor segment having a smaller resistance value than the as-fabricated resistance value of the pull-up resistor;
    a sliding switch attached to the pull-up resistor, the sliding switch configured to short at least one resistor segment in the pull-up resistor;
    a multiplexer connected to the selectable voltage output tabs, the multiplexer configured to select an output voltage tab for a selected resistance segment having a selected resistance value to match a target resistance value for the pull-up resistor; and
    an analog-to-digital convertor (ADC) configured to digitize a voltage on the external temperature-dependent resistor and a voltage on the selected output voltage tab for the selected resistance segment having the selected resistance value.

13. The integrated circuit of claim 12, wherein the external temperature-dependent resistor is a thermistor.

14. The integrated circuit of claim 12, wherein the multiplexer is further configured to activate the sliding switch to short the pull-up resistor segments between a top of the pull-up resistor and the selected resistance segment.

15. The integrated circuit of claim 12, further comprising, a data processing module configured to calculate a ratio of the voltages digitized by the ADC, the ratio being proportional to a resistance of the external temperature-dependent resistor.

16. The integrated circuit of claim 15, wherein the data processing module is further configured to map the calculated ratio to a temperature of the external temperature-dependent resistor based on a temperature-resistance relationship of the external temperature-dependent resistor in combination with the target resistance value of the pull-up resistor.

17. A method, comprising:
- disposing a thermistor as a temperature sensor in an environment;
- connecting a pull-up resistor in series to the thermistor in a voltage divider circuit, the pull-up resistor being fabricated in an integrated circuit and including a series of resistor segments connected to selectable voltage output tabs, each resistor segment having a smaller resistance value than an as-fabricated resistance value of the pull-up resistor;
- selecting an output voltage tab for a selected resistance segment having a selected resistance value to match a target resistance value for the pull-up resistor that is smaller than the as-fabricated resistance value of the pull-up resistor;
- calculating a ratio of a voltage on the thermistor and a voltage on the selected output voltage tab in the voltage divider circuit, the ratio being proportional to a resistance of the thermistor; and
- mapping the calculated ratio to a temperature value of the thermistor based on a temperature-resistance relationship of the thermistor in combination with the target resistance value of the pull-up resistor.

18. The method of claim 17, wherein mapping the calculated ratio to a temperature value of the thermistor includes interpolating the temperature value in a look-up table (LUT) representing the temperature-resistance relationship of the thermistor in combination with the target resistance value of the pull-up resistor.

19. The method of claim 17, wherein the selected resistance value to match the target resistance value for the pull-up resistor is selected based on a temperature of the integrated circuit measured by an on-chip temperature sensor.

20. The method of claim 17, wherein selecting the output voltage tab includes generating a digital trim code directing a multiplexer connected to the selectable voltage output tabs to select the output voltage tab of the selected resistance segment having the selected resistance value to match the target resistance value for the pull-up resistor.

21. The method of claim 20, wherein generating the digital trim code includes interpolating the digital trim code at a temperature of the integrated circuit from a stored list of trim codes for at least two different temperatures.

22. The method of claim 17, further comprising:
- shorting resistor segments between a top of the pull-up resistor and the selected resistance segment.

* * * * *